US008564740B2

(12) United States Patent
Schultz et al.

(10) Patent No.: US 8,564,740 B2
(45) Date of Patent: Oct. 22, 2013

(54) DIRECTIONAL BACKLIGHT WITH REDUCED CROSSTALK

(75) Inventors: John C. Schultz, Afton, MN (US); Michael J. Sykora, New Richmond, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 674 days.

(21) Appl. No.: 12/786,056

(22) Filed: May 24, 2010

(65) Prior Publication Data

US 2011/0285927 A1 Nov. 24, 2011

(51) Int. Cl.
*G02F 1/1335* (2006.01)

(52) U.S. Cl.
USPC ............... 349/65; 349/15; 362/612; 362/613

(58) Field of Classification Search
USPC .................................. 362/97.1–97.3; 349/65
See application file for complete search history.

(56) References Cited

U.S. PATENT DOCUMENTS

| 7,210,836 | B2 | 5/2007 | Sasagawa et al. | |
|---|---|---|---|---|
| 7,576,805 | B2 * | 8/2009 | Ito et al. | 349/15 |
| 2005/0052750 | A1 | 3/2005 | King et al. | |
| 2005/0140848 | A1 * | 6/2005 | Yoo et al. | 349/64 |
| 2006/0132673 | A1 | 6/2006 | Ito et al. | |
| 2006/0278754 | A1 | 12/2006 | Sankovic et al. | |
| 2008/0084519 | A1 | 4/2008 | Brigham et al. | |
| 2008/0170412 | A1 | 7/2008 | Ohno | |
| 2008/0218661 | A1 * | 9/2008 | Tsai et al. | 349/65 |
| 2008/0284945 | A1 * | 11/2008 | Schultz et al. | 349/65 |
| 2009/0256987 | A1 * | 10/2009 | Jeon et al. | 349/58 |
| 2009/0316058 | A1 | 12/2009 | Huizinga et al. | |

FOREIGN PATENT DOCUMENTS

| JP | 2001-066547 | 3/2001 |
|---|---|---|
| KR | 2007-0071773 | 4/2007 |

OTHER PUBLICATIONS

Sasagawa et al., "P-51: Dual Directional Backlight for Stereoscopic LCD" SID Symposium Digest of Technical Papers, vol. 34, Issue 1, May 2003, pp. 399-401.

* cited by examiner

*Primary Examiner* — Richard Kim

(57) ABSTRACT

A backlight suitable for use in an autostereoscopic display includes a light guide and a first and second light source assembly. The light guide has opposed first and second major surfaces, and opposed first and second side surfaces. The first and second light source assemblies are disposed to inject visible light into the light guide through the first and second side surfaces, respectively. Substantially all of the first side surface highly transmits a second light portion out of the light guide into air, the second light portion originating from the second light source assembly, and substantially all of the second side surface highly transmits a first light portion in a corresponding fashion. One or more first non-emitting surfaces of the first light source assembly are disposed at least partially between two light-emitting surfaces of the first light source assembly, and are adapted to substantially absorb visible light to reduce crosstalk.

21 Claims, 10 Drawing Sheets

DIRECTIONAL BACKLIGHT WITH REDUCED CROSSTALK

FIELD OF THE INVENTION

This invention relates generally to backlit displays, with particular application to such displays that present distinct left- and right-eye images to allow for stereoscopic viewing, and backlights therefor. The invention also relates to associated articles, systems, and methods.

BACKGROUND

A stereoscopic display usually presents an observer with images with parallax from individual right and left eye viewpoints. There are several techniques of providing the two eyes of the observer with the parallax images. In a first common stereoscopic technique, the observer utilizes a pair of shutter or 3D glasses which transmit or block light from the viewer's eyes in synchronization with alternating the left/right image display. In a second technique, right eye and left eye images are alternatively displayed and directed towards the respective eyes of the observer but without the use of 3D glasses. This second technique is referred to as autostereoscopic, and is advantageous for stereo 3-dimensional ("3D") viewing because there is no need for the observer to wear any type of specialized glasses.

A liquid crystal display (LCD) is a sample and hold display device such that the image at any point or pixel of the display is stable until that pixel is updated at the next image refresh time, typically ⅙₀ of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

Ensuring that the right and left light sources are on or off in synchronization with the image display is important to achieve a high quality autostereoscopic image. Further, if the left and right sources provide alternating illumination for a directional backlight structure which extracts light based on the light source end when the right eye image light input surface opposes a left eye image light input surface, light entering either surface can subsequently reflect off the opposing surface and create visual confusion between the left eye image and right eye image, i.e., such reflected light can produce crosstalk (unwanted overlap or interference) between left eye and right eye images, resulting in reduced 3D image quality.

BRIEF SUMMARY

We have developed a class of backlights suitable for use in autostereoscopic displays, although they can also be used in other (non-autostereoscopic) display and/or lighting applications. These backlights can provide a low amount of crosstalk between left eye and right eye images of the display, while also providing high luminance in a design that is generally easier to manufacture and assemble than other autostereoscopic backlights.

The present application therefore discloses, inter alia, a backlight suitable for use in an autostereoscopic display. The backlight includes a light guide, a first light source assembly, and a second light source assembly. The light guide has opposed first and second major surfaces, and opposed first and second side surfaces. The first and second light source assemblies are disposed to inject visible light into the light guide through the first and second side surfaces, respectively. Substantially all of the first side surface highly transmits a second light portion out of the light guide into air, the second light portion originating from the second light source assembly, propagating through the light guide, and impinging on the first side surface. Similarly, substantially all of the second side surface highly transmits a first light portion out of the light guide into air, the first light portion originating from the first light source assembly, propagating through the light guide, and impinging on the second side surface. One or more first non-emitting surfaces of the first light source assembly, which may e.g. be disposed at least in part between two light-emitting surfaces of the first light source assembly, are adapted to substantially absorb visible light to reduce crosstalk.

The first light source assembly may include a first plurality of light-emitting surfaces and the one or more first non-emitting surfaces, and the second light source assembly may likewise include a second plurality of light-emitting surfaces and one or more second non-emitting surfaces. The one or more second non-emitting surfaces are also preferably adapted to substantially absorb visible light, and may be disposed at least in part between two light-emitting surfaces of the second plurality of light-emitting surfaces. The one or more first and/or second non-emitting surfaces may have an average reflectivity of less than 10%, or less than 4%, for normally incident light in a range from 400-700 nm.

The first side surface may connect the first major surface to the second major surface, and may extend between a first and second corner of the light guide. The second side surface may also connect the first major surface to the second major surface, but may extend between a third and fourth corner of the light guide different from the first and second corners. At least a major portion, and in some cases substantially all, of the first and/or second side surfaces may be substantially flat.

Air may separate the first light source assembly from the first side surface, and may also separate the second light source assembly from the second side surface. For purposes of the present application, the term "air" is also intended to encompass a vacuum, unless otherwise indicated.

In some cases, the substantial absorption of visible light by the one or more first non-emitting surfaces may reduce a crosstalk luminance (i.e., unwanted luminance in a particular direction or range of directions) associated with an "on" state of the first and/or second light source assembly by at least 10%, or by at least 20%, or by at least 25%.

The first light source assembly may be designed to include a plurality of individual light sources, with intermediate non-emitting portions disposed between the individual light sources. Each of these intermediate non-emitting portions may include a non-emitting surface that substantially absorbs visible light. The second light source assembly may have the same or similar design. The first light source assembly may include a plurality of light emitting diodes (LEDs), and the second light source assembly may also include a plurality of LEDs. The LEDs may have a broad, e.g. white spectrum, or individual LEDs may provide only part of the visible wavelengths of light so that multiple LEDs, e.g. red, yellow, green, blue, or other combinations may be incorporated into the light source assembly. Multiple LEDs can be turned on and off in unison, or can be turned on and off in a desired color sequence.

The first and second side surfaces of the light guide may each include an anti-reflective coating applied thereto. Alternatively, the first and second side surfaces may simply be interfaces between a light-transmissive material and air, where the light-transmissive material forms the bulk or body of the light guide.

Also disclosed are methods of making backlights. At least some such methods may include providing a light guide having opposed first and second major surfaces, and opposed first and second side surfaces, the first side surface connecting the first major surface to the second major surface and extending between a first and second corner of the light guide, the second side surface also connecting the first major surface to the second major surface but extending between a third and fourth corner of the light guide different from the first and second corners. The methods may also include providing a first light source assembly, the first assembly comprising a first plurality of light-emitting surfaces and one or more first non-emitting surfaces, the first light source assembly being adapted to inject light from the first plurality of light-emitting surfaces into the first side surface of the light guide. The methods may also include providing a second light source assembly, the second assembly comprising a second plurality of light-emitting surfaces and one or more second non-emitting surfaces, the second light source assembly being adapted to inject light from the second plurality of light-emitting surfaces into the second side surface of the light guide. The methods may also include selectively applying a first absorptive material to at least a portion of the one or more first non-emitting surfaces without applying any absorptive material to the first plurality of light-emitting surfaces and without applying any absorptive material to the first side surface of the light guide. The methods may further include positioning the first light source assembly proximate the first side surface with an air gap therebetween.

Such methods may also include selectively applying a second absorptive material to at least a portion of the one or more second non-emitting surfaces without applying any absorptive material to the second plurality of light-emitting surfaces and without applying any absorptive material to the second side surface of the light guide, as well as positioning the second light source assembly proximate the second side surface with an air gap therebetween.

The selectively applying can be carried out so as to reduce a crosstalk luminance of the display by at least 10%, or by at least 20%, or by at least 25%.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 5b is a schematic front view of the light source assembly of FIG. 5a;

In the figures, like reference numerals designate like elements.

DETAILED DESCRIPTION OF ILLUSTRATIVE EMBODIMENTS

Figure 1A:
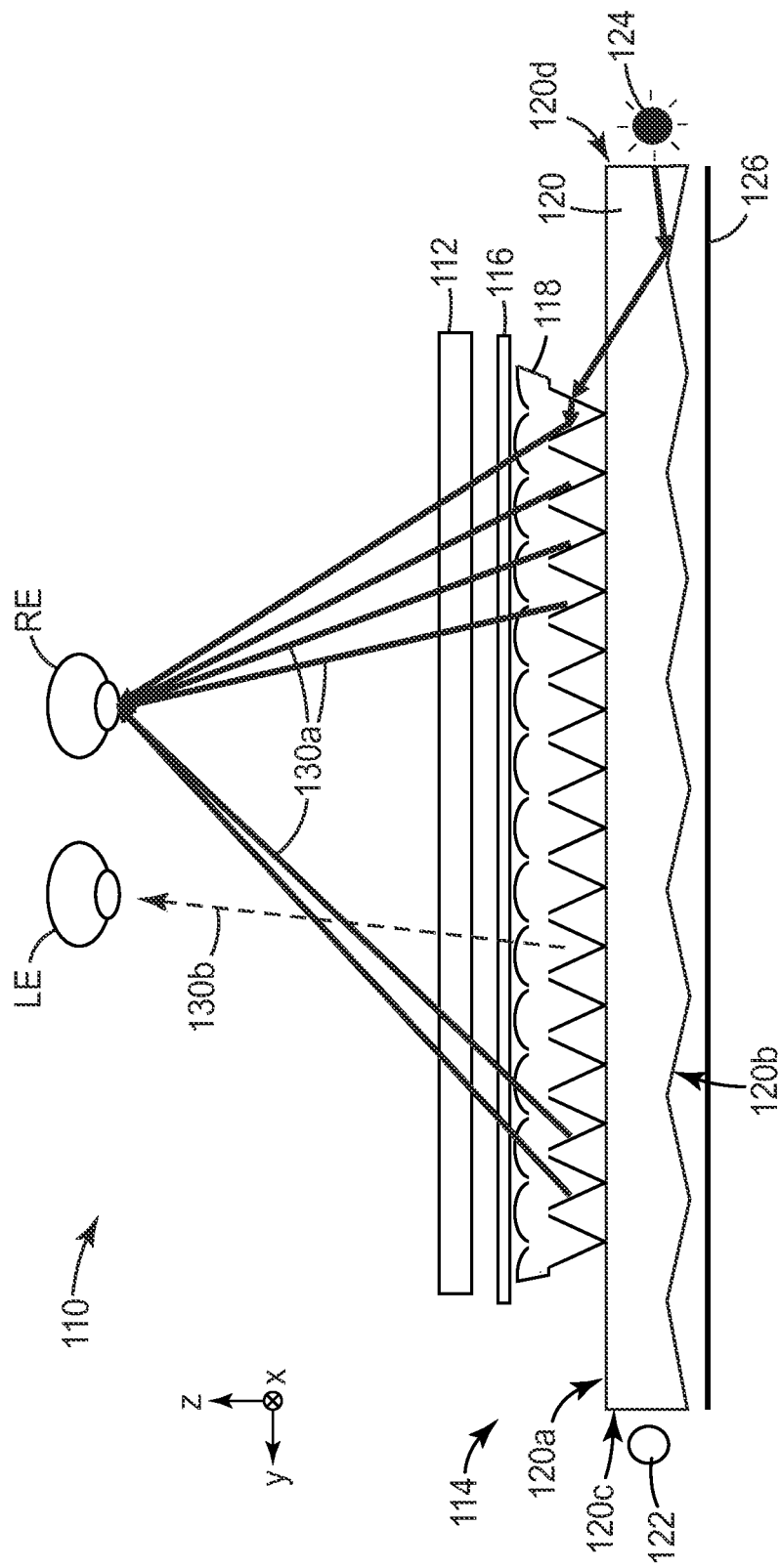
FIGS. 1a and 1b are schematic side views of a 3D autostereoscopic display device including a backlight, the display device capable of presenting different images to the right and left eyes.

As outlined above, we describe herein, among other things, techniques that reduce light reflection from the far end of a light guide—i.e., the end of the light guide farthest from the light source assembly being energized—in a backlight suitable for use in an autostereoscopic display. The techniques can reduce visual crosstalk between left and right images, resulting in an improved autostereoscopic 3D viewing experience.

In some cases, the techniques utilize only a simple flat surface for each end of the light guide, and also use material (s) that strongly absorb visible light and that are spaced apart from, but typically in relatively close proximity to, the light guide in order to reduce or minimize the amount of light reflected back into the light guide, thus reducing crosstalk. The absorptive material, which typically would have a black appearance due to strong absorption over at least visible wavelengths, may be applied e.g. in a thin or thick film to surfaces of existing components or structures (other than the light guide itself), for example, non-emitting surfaces of light source components such as packaged LEDs, wires and electrical traces, circuit boards and flexible circuit films, substrates, heat sinks, covers, shields, baffles, and other mechanical structures that are disposed and oriented in such a way that light that passes out of the light guide can (directly or indirectly) reflect from them back into the light guide. Alternatively or additionally, the components or other structures that are disposed and oriented in this way may utilize absorptive material in their construction or in the construction of their constituent parts or elements. Alternatively or additionally, a mass, volume, or sheet of absorptive material may be injected or otherwise introduced in such a way as to partially or wholly encapsulate or cover components or other structures that would otherwise reflect light back into the light guide. Regardless of how the absorptive material is provided, it preferably results in absorptive surfaces or volumes that are substantially separated from the end of the light guide by an air gap, and it is preferably not provided on light-emitting surfaces of light sources or light source assemblies in ways that would significantly reduce the luminance of the backlight or display. Also, it is preferably not provided in any substantial amount on the end of the light guide.

Advantages of these techniques, some of which are discussed further below, may include one or more of: reduced or eliminated vignetting of light sources, thus increasing the amount of light coupled into the light guide and reducing the mixing zone length; simplified light guide manufacture, e.g., the light guide may be injection molded, cut from a film, or otherwise fabricated without the need for any end surface treatment; simplified backlight construction by avoiding the need to precisely align light sources with apertured areas of the light guide; relatively simple design of the light source assembly, particularly in cases where absorptive material is used only at surfaces that lie between emitting surfaces of the light sources (e.g. output faces of LEDs) and that are substantially coplanar with such emitting surfaces.

Each end of the light guide (sometimes also referred to herein as a side surface or light-injection surface of the light guide) is preferably adapted to highly transmit visible light out of the light guide into air. If the side surface is a simple flat interface between air and the light-transmissive material, such as acrylic, that forms the bulk or body of the light guide, such high transmission is typically up to about 95 or 96%, with typically at least 4 or 5% of the light undergoing Fresnel reflection back into the light guide at the air interface. A 4% reflectivity is typical for normally incident light, but obliquely incident light (which propagates through a typical light guide) can have substantially higher reflectivity, such that the average over all incident angles of light may be 10% or more. In some cases, an anti-reflective coating may be deposited on the side surface of the light guide so as to reduce the reflectivity, and increase the transmissivity, of the interface even more.

Figure 1B:
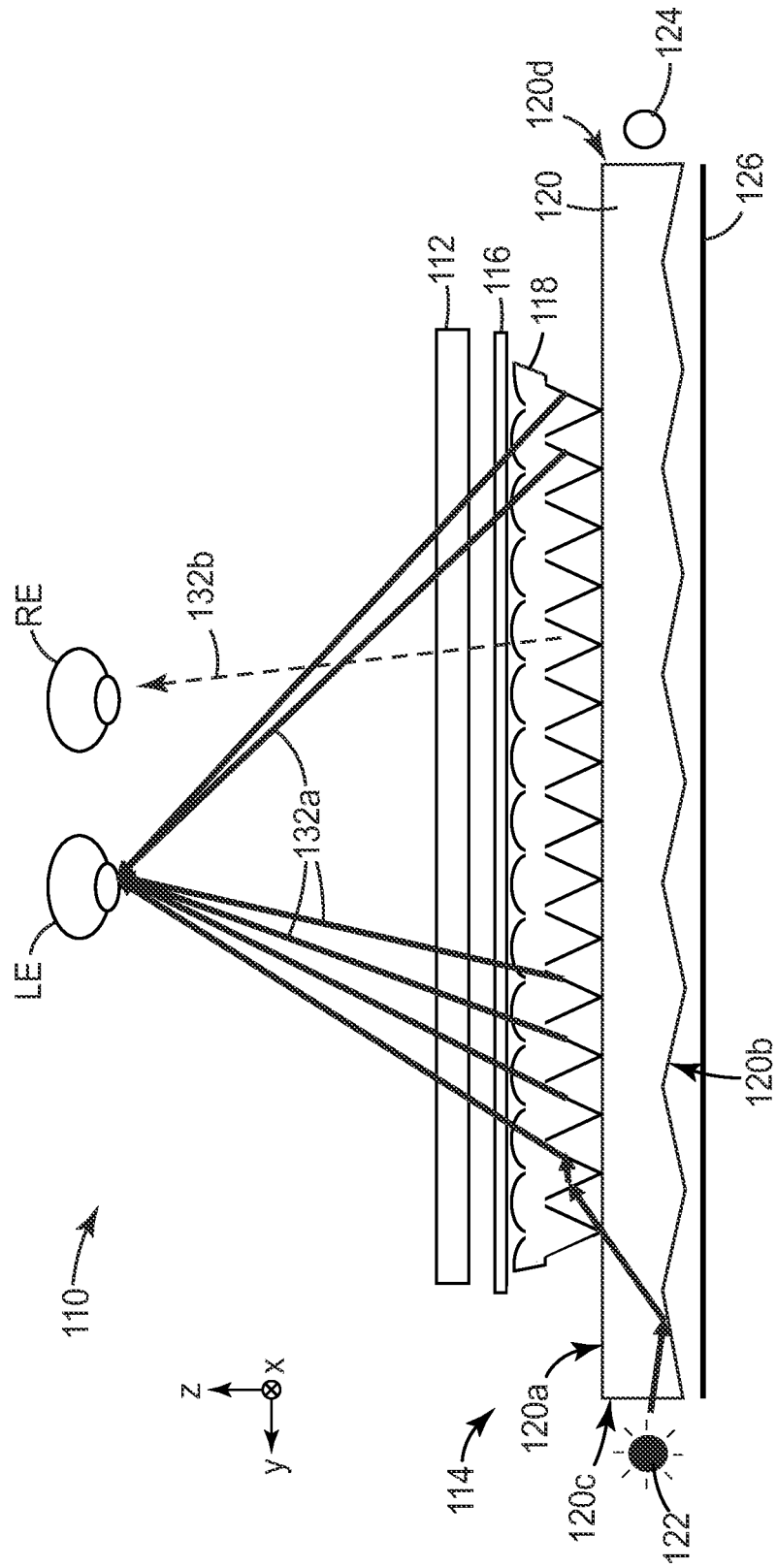

Turning now to FIGS. 1a and 1b, we see depicted there some typical components of, as well as the basic operation of, a backlit autostereoscopic 3D display 110. In short, an observer having a left eye LE and a right eye RE views the display 110, and, by virtue of its construction and operation, perceives a 3-dimensional image. The display is depicted in the context of a Cartesian x-y-z coordinate system for ease of description, but the reader will understand that this does not limit the present disclosure to nominally planar displays, backlights, or light guides, for example.

The display 110 includes a liquid crystal panel 112 having individual pixels arranged in a matrix that defines an active or working area of the panel, the pixels being individually addressable by a controller (not shown). The controller sends control signals to the panel 112 to form any desired image, preferably in a colored or RGB (red-green-blue) sub-pixel format, in the active area of the panel 112. The display 110 is provided with a backlight, shown generally at 114, to make the image noticeable to the observer. The backlight 114 may be considered to include a polarizer 116, a 3D redirecting film 118, a light guide 120, first and second light source assemblies 122, 124, respectively, and a back reflector 126. Some of these components, e.g. the back reflector 126 and/or the polarizer 116, may be omitted depending upon system requirements and design details, and other light management films or components, such as polarizing films (including reflective polarizing films), mirror films, diffusing films, multilayer optical films, window films, retarder films, prismatic brightness enhancement films, and other microstructured or non-microstructured films, may be added to the system as deemed appropriate by the system designer. Further, some components, such as the polarizer 116 and/or the redirecting film 118, may be considered to be part of the panel 112 rather than part of the backlight 114, or may be considered to be neither part of the backlight 114, nor part of the panel 112.

The light guide 120 is a key part of the backlight 114. The light guide has first and second major surfaces 120a, 120b, and first and second side surfaces 120c, 120d, as shown. The light guide receives light via the side surfaces 120c, 120d from the light source assemblies 122, 124, preferably in a sequential or alternating fashion, and causes the light from each of those assemblies to spread out, via multiple reflections, over an extended area of the light guide corresponding at least to a working area of the panel 112. As light from a given light source assembly traverses the length of the light guide, some of the light is extracted from the front or top surface (major surface 120a) of the light guide. This extracted light is typically highly oblique, e.g., peaking in luminance at about 70 degrees from the normal direction (z-axis) as measured in air, or having a peak luminance in a typical range from 50 to greater than 80 degrees, or from 60 to greater than 80 degrees. This highly oblique light is intercepted by the redirecting film 118, which is microstructured in such a way as to redirect the highly oblique light exiting the light guide 120 so that it is directed closer to the optical axis of the system, i.e., closer to the z-axis.

Due to the design of the light guide 120, light originating from the assembly 124 exits the surface 120a of the light guide at a highly oblique angle in a leftward-direction (closer to the +y direction) from the perspective of FIGS. 1a and 1b, while light originating from assembly 122 exits the surface 120a at a highly oblique angle in a rightward-direction (closer to the −y direction) from the same perspective. The redirecting film 118 is designed to redirect the oblique light originating from the assembly 124 in directions generally corresponding to light rays 130a, i.e., towards a right eye RE of the observer. The redirecting film 118 likewise redirects the oblique light originating from the assembly 122 in directions generally corresponding to light rays 132a, i.e., towards a left eye LE of the observer.

FIGS. 1a and 1b depict the display 110 at two different points in time. In FIG. 1a, light source assembly 124 is energized (turned "on") and light source assembly 122 is not (i.e. it is turned "off"), and in FIG. 1b, light source assembly 122 is energized and light source assembly 124 is not. The display is preferably controlled to alternate between these two illumination states. In synchrony with that alternating illumination, the controller causes the panel 112 to display a right-eye image when assembly 124 is energized, and a left-eye image when assembly 122 is energized. Rapid synchronous switching, e.g., switching frequencies of at least 90 Hz, or 100 Hz, or 110 Hz, or 120 Hz or more, between the right-eye image (and the assembly 124) and the left-eye image (and the assembly 122) allows the observer to perceive a stable 3D video image without requiring the observer to wear any special eyewear.

In the operation of the display 110, crosstalk occurs when light from the backlight reaches the left eye LE while the right-eye image is being displayed, and/or when light from the backlight reaches the right eye RE while the left-eye image is being displayed. Such crosstalk, which degrades the 3D viewing experience, is depicted by light ray 130b in FIG. 1a, and by light ray 132b in FIG. 1b.

One source of crosstalk is light that reflects at or near a side surface of the light guide opposite the side surface from which such light entered the light guide. For example, with reference to FIG. 1a, light from assembly 124 enters the light guide through side surface 120d. Some of this light exits the light guide via surface 120a and is properly directed to the right eye RE, but some light remains in the light guide until it reaches the opposite side surface 120c. At this point, any light that is reflected back into the light guide towards the energized light source assembly (whether by reflection from the surface 120c itself or by reflection from objects disposed outside the light guide but near the surface 120c) will travel through the light guide as if originating from the non-energized light source, in this case, light source assembly 122. Such light is extracted from the light guide 120 and redirected by the redirecting film 118 toward the left eye LE as unwanted crosstalk light 130b. A completely analogous situation occurs for crosstalk light 132b when light source assembly 122 is energized.

The techniques described herein can provide reduced crosstalk while also providing high luminance in a design that is generally easier to manufacture and assemble than other autostereoscopic backlights. Before explaining these techniques in greater detail, we first provide some further description of exemplary light guides 120 and redirecting films 118 that can be employed in the disclosed backlights and displays.

Exemplary light guides are composed of a suitable light-transmissive material such as a polymer or glass. The light guide may be relatively rigid or flexible, and it may be relatively thin (e.g. in the form of a film) or thick. The light guide may have a substantially rectangular shape in plan view as shown in the drawings, but non-rectangular shapes may also be used. A back or rear major surface (see surface 120b in FIGS. 1a and 1b) of the light guide is preferably shaped to include a plurality of extraction elements; features such as linear lenticular features, or linear prism features are useful. Each of the linear prisms may extend in a direction parallel to the side surfaces 120c, 120d, i.e., parallel to the x-axis shown in the figure. The linear prism features cause the back major surface (see surface 120b) to substantially redirect (e.g., reflect, extract, and the like) light, while the front major surface (see surface 120a) substantially transmits light. In some cases, a highly reflective surface on or adjacent the back major surface helps to redirect light out of the backlight through the front major surface. The front major surface may be substantially flat, but is preferably structured with light spreading elements such as lenticular, prismatic, or similar features that spread the light in the vertical direction, i.e., in the x-z plane of FIG. 2. Further design details regarding light guides suitable for use in autostereoscopic backlights can be found in U.S. Pat. No. 7,210,836 (Sasagawa et al.), and U.S. Pat. No. 8,068,187 (Huizing a et al.). Reference is also made to U.S. Pat. No. 8,179,362 (Brigham et al.).

Exemplary redirecting films have structured or faceted features on both major surfaces of the film. The front major surface, which faces the observer, may comprise linear lenticular features. The back major surface, which faces the light guide, may comprise linear prismatic features. The linear prismatic features are preferably parallel to each other, and parallel to the linear lenticular features on the front surface of the film. Moreover, the redirecting film is preferably oriented such that the linear lenticular and prismatic features of the redirecting film are parallel to the prismatic features on the back major surface of the light guide. The lenticular and prismatic features of the redirecting film are designed such that the highly oblique light emitted by the front major surface of the light guide is converted to more axially-directed light emitted at the proper angles such that an observer can perceives depth in the displayed image. Further design details of exemplary redirecting films can be found in one or more of the following documents: U.S. Pat. Nos. 7,210,836 (Sasagawa et al.), 7,225,529 (King et al.), 8,179,362 (Brigham et al.), and 8,068,187 (Huizing a et al.).

Figure 2:
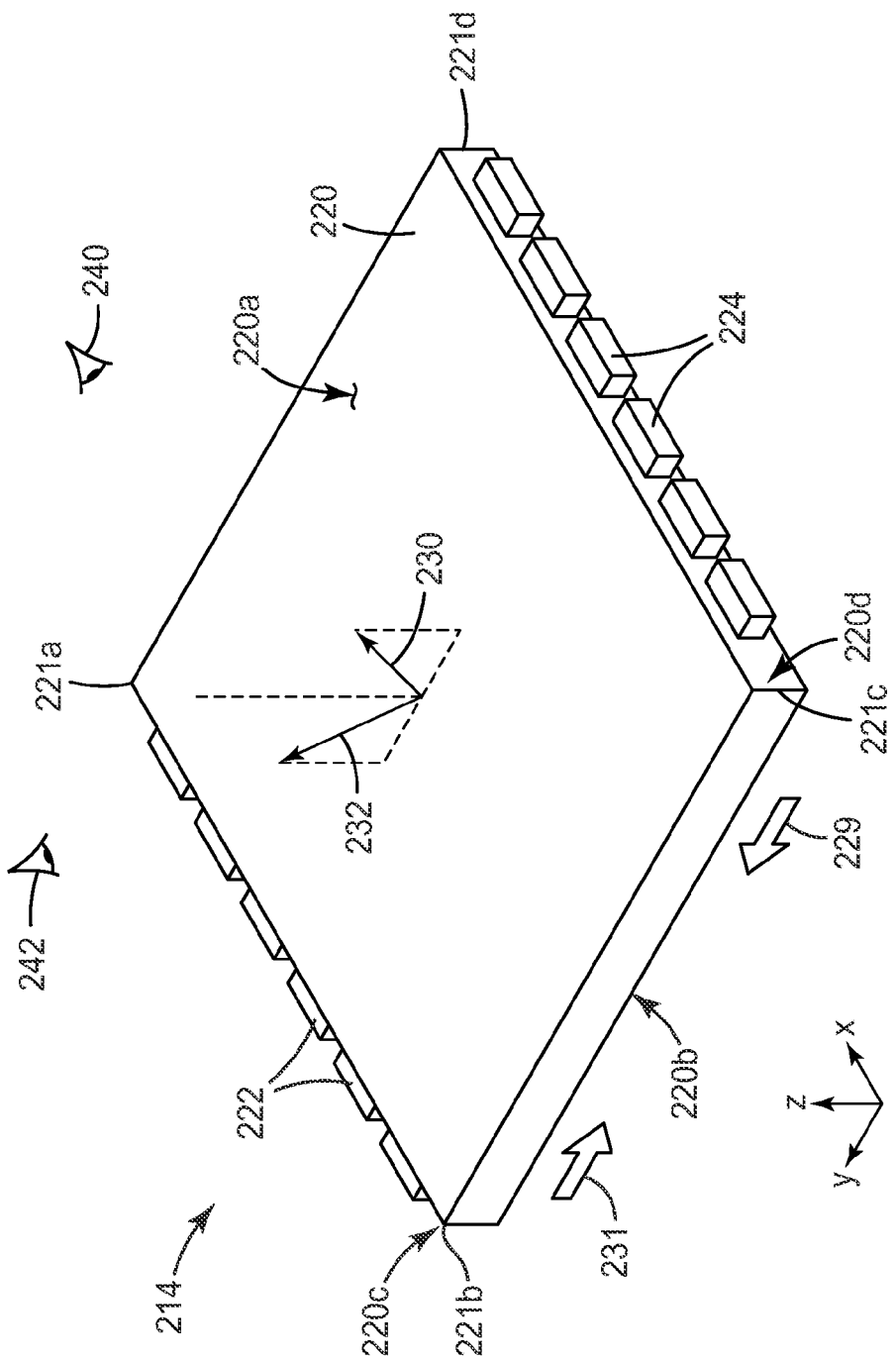
FIG. 2 is a perspective view of a backlight suitable for use in an autostereoscopic display device.

FIG. 2 shows a perspective view of a backlight 214 suitable for use in an autostereoscopic display device. The backlight includes a light guide 220 having first and second major surfaces 220a, 220b, respectively. Although these surfaces are shown to be flat for schematic purposes, they may have the same or similar design as the corresponding major surfaces of the light guides discussed above so as to provide suitable light extraction over an extended area. The light guide 220 also includes first and second side surfaces 220c, 220d, respectively. The first side surface 220c connects the first major surface 220a to the second major surface 220b, and extends from a first corner 221a to a second corner 221b of the light guide 220. The second side surface also connects the first major surface 220a to the second major surface 220b, but extends from a third corner 221c to a fourth corner 221d of the light guide. A first light source assembly, composed of a row of light sources 222, is disposed to inject visible light into the light guide 220 through the first side surface 220c. A second light source assembly, composed of a row of light sources 224, is disposed to inject visible light into the light guide 220 through the second side surface 220d.

Just as with the operation described in connection with FIGS. 1a and 1b, the different light source assemblies of FIG. 2 cause light to be emitted from the extended area of the backlight with different angular distributions. This is depicted schematically by light rays 230 and 232, and observers 240 and 242. In the absence of a redirecting film, light from the first light source assembly (see sources 222) is emitted from the major surface 220a of the light guide at highly oblique angles in a direction similar to (but typically more oblique than) light ray 230, and light from the second light source assembly (see sources 224) is emitted from the major surface 220a of the light guide at highly oblique angles in a direction similar to (but typically more oblique than) light ray 232. However, when a suitable redirecting film (not shown) is added, light from the first light source assembly is emitted from the backlight in more axial directions similar to (but typically more aligned with the optical axis or z-axis than) light ray 232, and light from the second light source assembly is likewise emitted from the backlight in more axial directions similar to (but, again, typically more axially aligned than) light ray 230.

Although it is not apparent in the schematic view of FIG. 2, the light sources 222, 224 are not in optical contact with their respective side surfaces. Rather, the light sources are spaced apart from their respective light guide side surfaces by at least by a slight amount so that an air gap is created between each light source and the adjacent side surface of the light guide. In this way, substantially the entire surface areas of the first and second side surfaces are exposed to air. Note that even when a light source with a nominally flat front surface is placed in contact with a nominally flat side surface of a light guide, an air gap of optical dimensions is still substantially present, unless steps are taken to eliminate it, e.g. with an index matching gel provided between the surfaces, or by making the surfaces optically flat and pressing the light source against the side surface of the light guide with high pressure.

The light guide is preferably designed such that its air-exposed side surfaces 220c, 220d are highly transmissive to visible light from the light sources. For example, light that originates from the light sources 222, enters the light guide 220 through side surface 220c, propagates through the light guide 220 in the general direction 231, and impinges on the side surface 220d, is highly transmitted out of the light guide into air. Similarly, light that originates from light sources 224, enters the light guide 220 through side surface 220d, propagates through the light guide 220 in the general direction 229, and impinges on the side surface 220c, is also highly transmitted out of the light guide into air. If no anti-reflection coating is provided on the side surfaces 220c, 220d, a small amount of reflection, e.g. about 4%, will occur at the light guide/air interface, and the remainder of the light will be transmitted into the air adjacent the side surfaces. If anti-reflection coatings are provided, even less light will be reflected, and even more light will be transmitted into the air. A simple anti-reflection coating may consist essentially of a single layer of a material whose refractive index is lower than that of the material of which the light guide 220 is composed. If the light guide is composed of a clear acrylic or similar light-transmissive polymer material, the anti-reflection coating may be a quarter-wave thick layer of magnesium fluoride, for example. Alternatively, more complicated anti-reflection coatings can be used, e.g., coatings that utilize multiple layers and multiple optical materials.

We have found it advantageous to reduce crosstalk by keeping the design of the light guide simple, and by adapting the light source assemblies and/or other components in the general vicinity of the light sources (but spaced apart from the light guide) to absorb light that escapes the light guide via its side surfaces (light-injection surfaces). Thus, for example, in some cases substantially the entire areas of the first and second side surfaces are adapted to highly transmit light out of the light guide into air, and substantially no absorptive material is present on the side surfaces. Instead, absorptive material is provided on one or more portions of the light source assemblies. One may choose to render many different surfaces of the light source assemblies highly absorptive, or only some of the surfaces may be rendered absorptive. As mentioned elsewhere herein, the absorptive material may be applied in a thin or thick film to surfaces of existing components or structures other than the light guide itself, for example, non-emitting surfaces of light source components such as packaged LEDs, wires and electrical traces, circuit boards and flexible circuit films, substrates, heat sinks, covers, shields, baffles, and other mechanical structures that are disposed and oriented in such a way that light that passes out of the light guide can directly or indirectly reflect from them back into the light guide. Alternatively or additionally, the components or other structures that are disposed and oriented in this way may utilize absorptive material in their construction or in the construction of their constituent parts or elements. Alternatively or additionally, a mass, volume, or sheet of absorptive material may be injected or otherwise introduced in such a way as to partially or wholly encapsulate or cover components or other structures that would otherwise reflect light back into the light guide. Regardless of how the absorptive material is provided, it preferably results in absorptive surfaces or volumes that are substantially separated from the end of the light guide by an air gap, and it is preferably not provided on light-emitting surfaces of light sources or light source assemblies in ways that would significantly reduce the luminance of the backlight or display.

The light source assemblies of the disclosed backlights and displays may comprise any suitable light source or lamp now known, or developed or introduced after the filing date of the present application. Preferably, the light source is capable of modulation at a rate of, for example, at least 90 Hz. In most applications, it is desirable for the backlight to emit white light. ("White light" in this regard refers simply to light that is perceived by the observer as nominally white, even though the light may have a discontinuous or spiked power spectrum over the visible wavelength range. White light may also be perceived by rapid modulation of distinct colors that individually are not white.) In those cases, the individual light sources or lamps used in the light source assemblies may each emit white light, and/or, clusters or groups of colored light sources may be used, e.g., one or more clusters of a red-emitting source, a green-emitting source, and a blue-emitting source. In some applications, however, it may be desirable for the backlight to emit light that is perceived to be colored, e.g., green or red, rather than white.

Solid state light sources are particularly advantageous in many applications. A particularly convenient solid state light source or lamp, due to its small size, high luminance, robustness, and ease of operation, is the light emitting diode or "LED". In this regard, a "light emitting diode" or "LED" refers to a diode that emits light, whether visible, ultraviolet, or infrared. It includes incoherent encased or encapsulated semiconductor devices marketed as "LEDs", whether of the conventional or super radiant variety, and whether of the forward-emitting or side-emitting variety, the latter of which is sometimes advantageous in display applications. If the LED emits non-visible light such as ultraviolet light, and in some cases where it emits visible light, it can be packaged to include an organic or inorganic phosphor to convert short wavelength light to longer wavelength visible light, in some cases yielding a device that emits white light. An "LED die" is an LED in its most basic form, i.e., in the form of an individual component or chip made by semiconductor processing procedures. For example, the LED die is ordinarily formed from a combination of one or more Group III elements and of one or more Group V elements (III-V semiconductor). Examples of suitable III-V semiconductor materials include nitrides, such as gallium nitride, and phosphides, such as indium gallium phosphide. Other types of III-V materials can be used also, as might inorganic materials from other groups of the periodic table. The component or chip can include electrical contacts suitable for application of power to energize the device. Examples include solder reflow, wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. The LED die may also be mounted on a ceramic header or substrate.

A plurality of LEDs such as Nichia NSSW020B (Nichia Chemical Industries, Ltd., Japan) may be used in some embodiments. Furthermore, one or more organic light emitting diodes (OLEDs), and/or one or more laser diodes, may be used in the disclosed light source assemblies, for example.

Figure 3A:
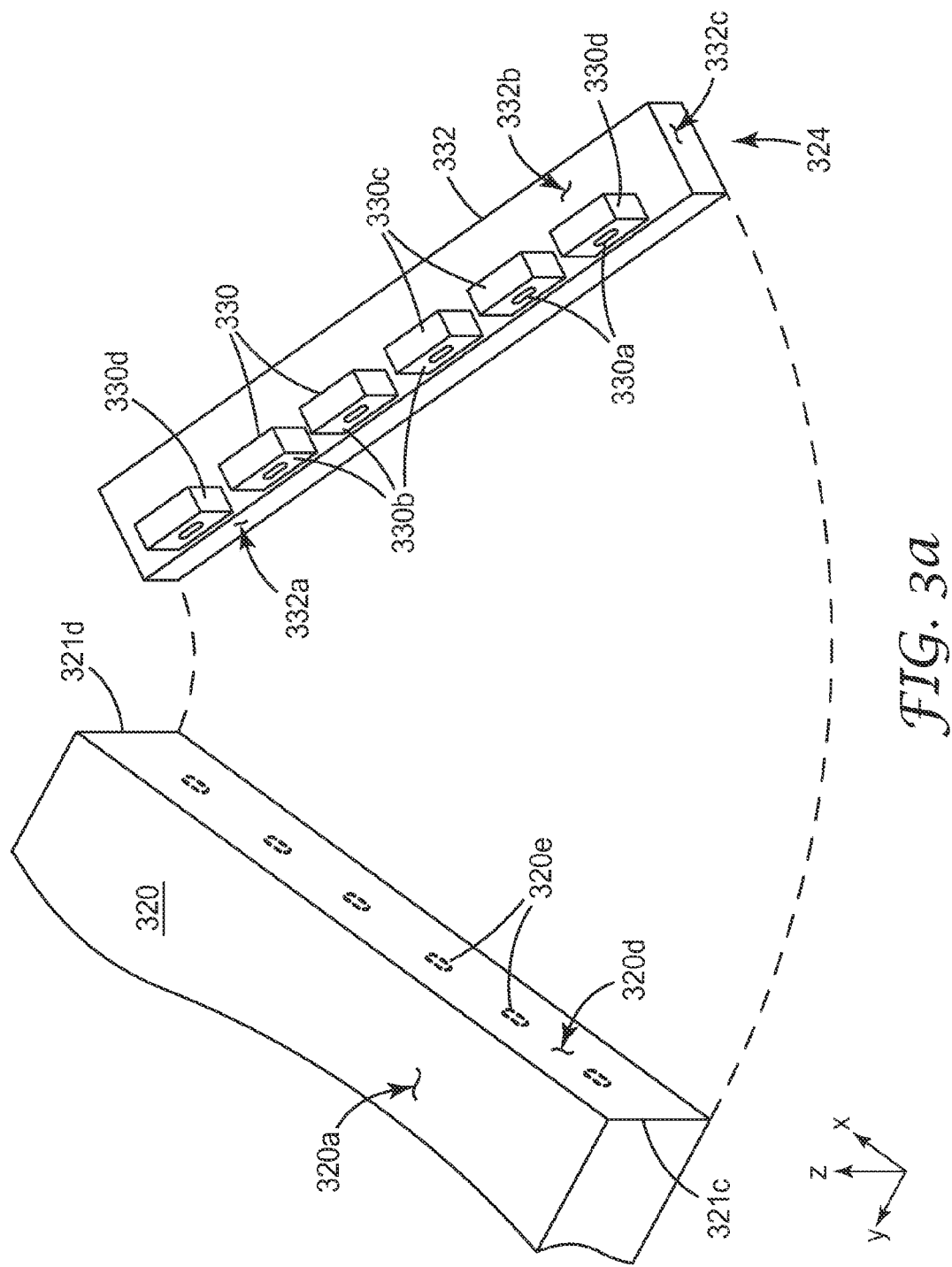
FIG. 3a is a perspective view of some components of a backlight suitable for use in an autostereoscopic display device, including a portion of a light guide and a light source assembly.

Turning now to FIG. 3a, we see there a perspective view of some components of a backlight suitable for use in an autostereoscopic display device, including a portion of a light guide 320, and a light source assembly 324 which is shown moved away from its intended position adjacent the light guide via broken arc-shaped lines. These components may correspond substantially to the light guide 220 and second light source assembly (see sources 224) of FIG. 2. The light guide 320 has a major surface 320a from which light is extracted and eventually directed to the observer. The light guide 320 also has a side surface 320d which serves as a light-injection surface for the light source assembly 324. The side surface 320d connects the two major surfaces of the light guide, and also extends from a corner 321c to a corner 321d of the light guide.

In exemplary embodiments the side surface 320d may be substantially flat, although it need not be, and preferably is not, optically flat, i.e., flat to within optical tolerances. On a side of the light guide 320 opposite the side surface 320d is another side surface (not shown), which serves as a light-injection surface for another light source assembly (not shown). Light from that light source assembly propagates through the light guide 320 generally in the −y direction, and light that is not extracted through the major surface 320a impinges upon the side surface 320d. Similarly, light from the light source assembly 324 propagates through the light guide 320 generally in the +y direction, and light that is not extracted through the major surface 320a impinges upon the opposite side surface that is not shown in FIG. 3a.

When mounted in its intended position, the light source assembly 324 may be positioned against, or adjacent to, the side surface 320d. The assembly 324 is shown to have a plurality of individual light sources or lamps 330 arranged in a row that extends in the direction of elongation of the side surface 320d. The lamps 330, which may be LEDs or any other suitable light source, are mounted on a substrate or carrier 332, which may be a rigid or flexible circuit board or simply a member to provide mechanical stability. The substrate 332 has a number of distinct surfaces, including a front surface 332a, a top surface 332b, and side surfaces 332c. Lamps 330 also have a number of distinct surfaces, including light-emitting surfaces 330a, and non-light-emitting surfaces 330b, 330c, and 330d, for example. A given light-emitting surface may be, for example, a region on the surface of a semiconductor chip that emits light, or, in the case of a packaged device, it may be the surface of a lens or encapsulant from which such light emerges. When the assembly 324 is mounted in its intended position adjacent the light guide, the light emitting surfaces 330a line up with corresponding portions 320e of the side surface 320d. Preferably, an air gap is maintained between the side surface 320d and the assembly 324, even if the assembly 324 or portions thereof make physical contact with the side surface.

Figure 3B:
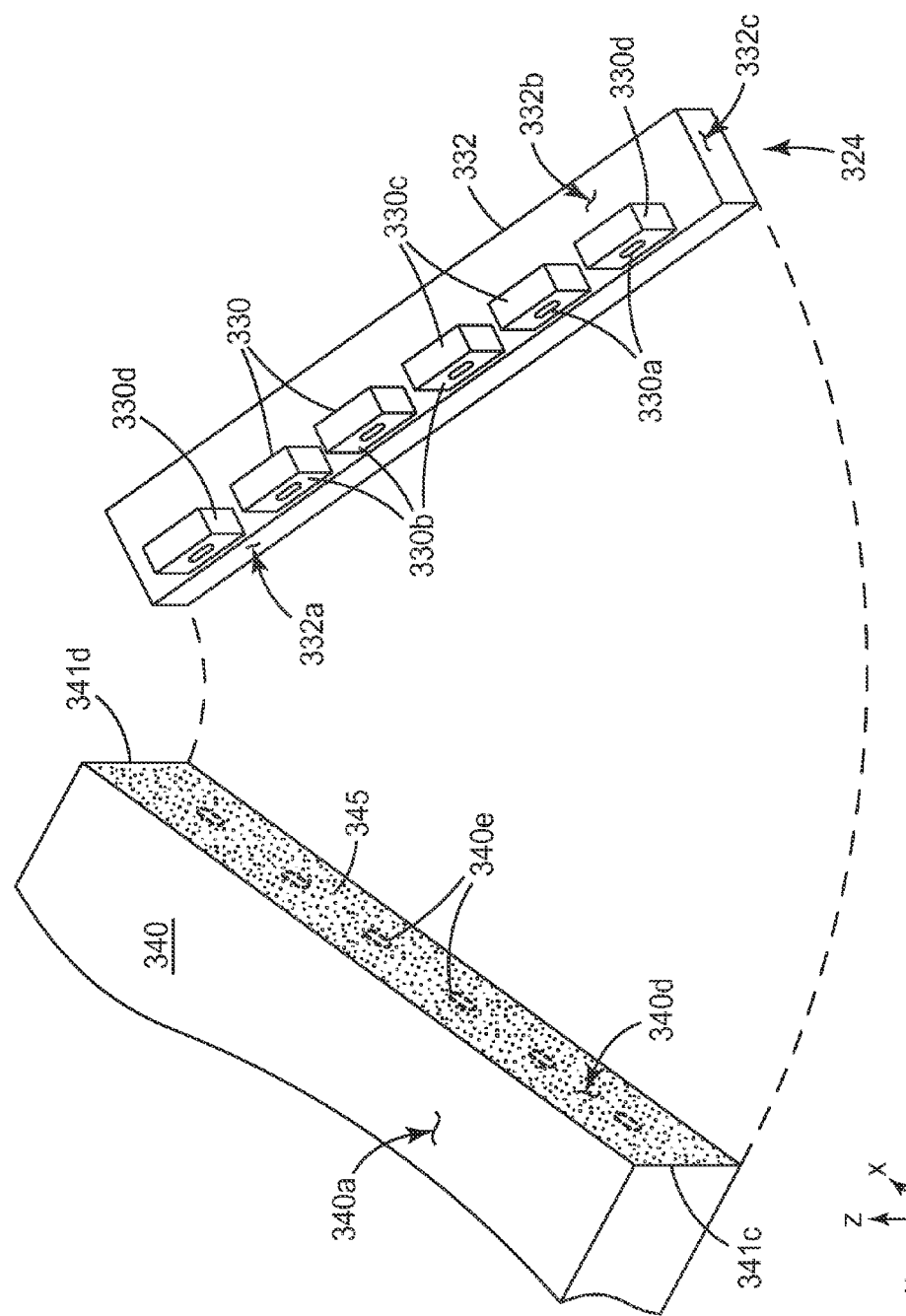
FIG. 3b is a perspective view similar to FIG. 3a, but where absorptive material has been applied to portions of a side surface or light-injection surface of the light guide.

FIG. 3b is a perspective view of backlight components similar to those of FIG. 3a, but where absorptive material has been applied to portions of a side surface or light-injection surface of the light guide. This embodiment is provided chiefly for comparison purposes so that the reader can appreciate the benefits of the preferred constructions disclosed herein.

In FIG. 3b, the light source assembly 324 may be identical to the assembly 324 shown and described in connection with FIG. 3a, and thus the same reference numerals are used and no further description is necessary. The light guide 340 of FIG. 3b may also be substantially the same as light guide 320 of FIG. 3a, except for the addition of a layer of absorptive material 345 which covers, and is in direct physical contact (no air gap) with, the light-injection or side surface 340d of the light guide 340 except for portions 340e which line up with light-emitting surfaces 330a of the assembly 324. The portions 340e may be apertures or holes in the layer of material 345. Except for the presence of the absorptive material 345, light guide 340 may correspond substantially to light guide 320, surfaces 340a and 340d may correspond substantially to surfaces 320a and 320d, respectively, portions 340e may correspond substantially to portions 320e, and corners 341c, 341d may correspond substantially to corners 321c, 321d, respectively.

The absorptive material 345 in the embodiment of FIG. 3b can help to reduce crosstalk relative to the embodiment of FIG. 3a, because light from the opposite light source assembly (not shown) that travels through the light guide and that impinges on the side surface 340d may be predominantly absorbed by the material 345 rather than being reflected back into the light guide, where it can contribute to crosstalk. However, we have found that placing the absorptive material on the side surface of the light guide in this way can also have significant drawbacks. One drawback is simply the additional manufacturing steps that are needed to provide the absorptive material on selected portions of the side surface of the light guide, particularly since the light guide is a key component of the backlight, and may include delicate surfaces or features that may be damaged with increased handling, thus reducing yield.

Figure 4:
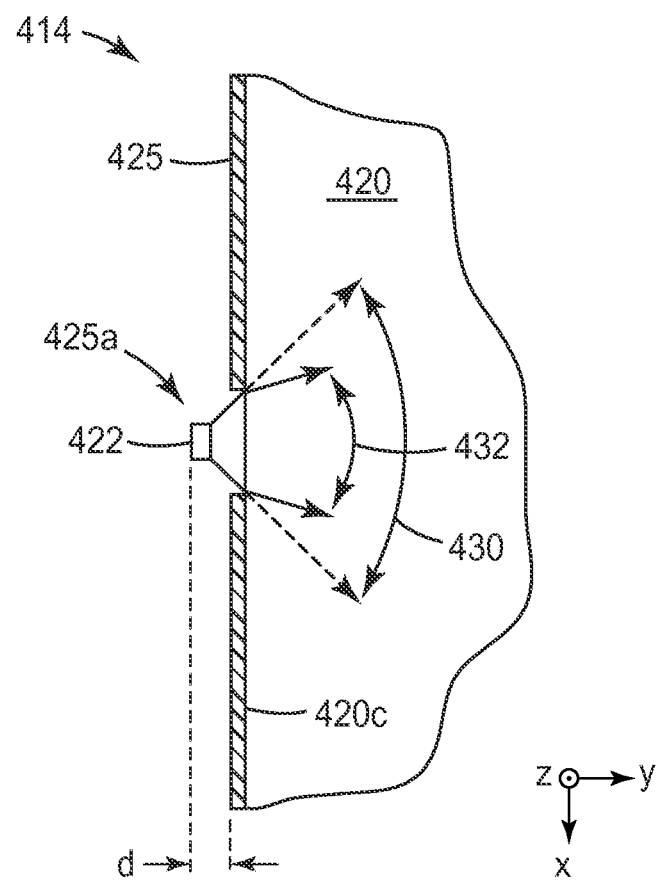
FIG. 4 is a schematic side view of a light source disposed to inject light into a light guide of a backlight, this view demonstrating alignment and vignetting issues that can arise when absorptive material is applied to a light-injection surface of the light guide.

Other drawbacks of the crosstalk-reducing approach of FIG. 3b are explained with reference to the schematic side view of FIG. 4. FIG. 4 depicts a light source 422 (or more precisely, the emitting surface of a light source) disposed to inject light into a light guide 420 of a backlight 414. This view demonstrates alignment and vignetting issues that can arise when absorptive material is applied directly to a light-injection surface of the light guide. Thus, in the backlight 414 of FIG. 4, the light source 422 is disposed proximate a light-injection surface or side surface 420c of the light guide. Light propagates in the light guide generally in the +y direction, and some light is extracted from a major surface of the light guide 420 and eventually directed to the observer. Some of the light remains in the light guide and impinges upon an opposite side surface (not shown), at which another light source (not shown) is positioned so as to inject light through the light guide generally in the opposite (−y) direction. Some of this light remains in the light guide and impinges upon the side surface 420c. A layer of absorptive material 425 is provided directly on the surface 420c to absorb this light so that it does not reflect back into the light guide, where it can contribute to crosstalk. An aperture or hole 425a is provided in the layer 425 to allow light from the source 422 to enter the light guide.

One drawback of the arrangement of FIG. 4 relates to vignetting of the light source. Vignetting, in this regard, refers to the capture of light emitted by the light source only in a limited acceptance cone or solid angle, and the failure to capture light emitted outside the acceptance cone. In FIG. 4, by virtue of (1) the distance d between the light source 422 and the side surface 420c and/or the layer of absorptive material 425, and (2) the size and placement of the aperture 425a, the light guide 420 is able to capture light emitted by the light source 422 within the acceptance cone 430, as measured in air, but is unable to capture light emitted by the light source 422 at more oblique angles outside the acceptance cone 430 as a result of the layer of absorptive material 425. Vignetting can be reduced by reducing the distance d between the light source and the side surface of the light guide, but practical limitations can restrict how small this distance can be made. Vignetting can also be reduced by increasing the size of the aperture 425a, but at the expense of absorbing less light originating from the opposite light source, thus increasing crosstalk. Note that by virtue of refraction from air into the more optically dense medium of which the light guide is composed, light within the acceptance cone 430 is converted to a narrower acceptance cone 432 as measured in the medium of the light guide.

Another drawback of the arrangement of FIG. 4 relates to alignment considerations. Maximizing the amount of light captured from light source 422 may require precise alignment of the source 422, i.e., adjustment of its (x, z) coordinates, with respect to the aperture 425a. Moreover, if a plurality or row of light sources similar to source 422 is used, along with a corresponding plurality or row of apertures similar to aperture 425a, then the alignment considerations for source 422 must also be taken into account for all the other sources in the light source assembly. Such alignment considerations can detrimentally impact the rapid manufacture, yield, and long-term reliability of the backlight.

Figure 3C:
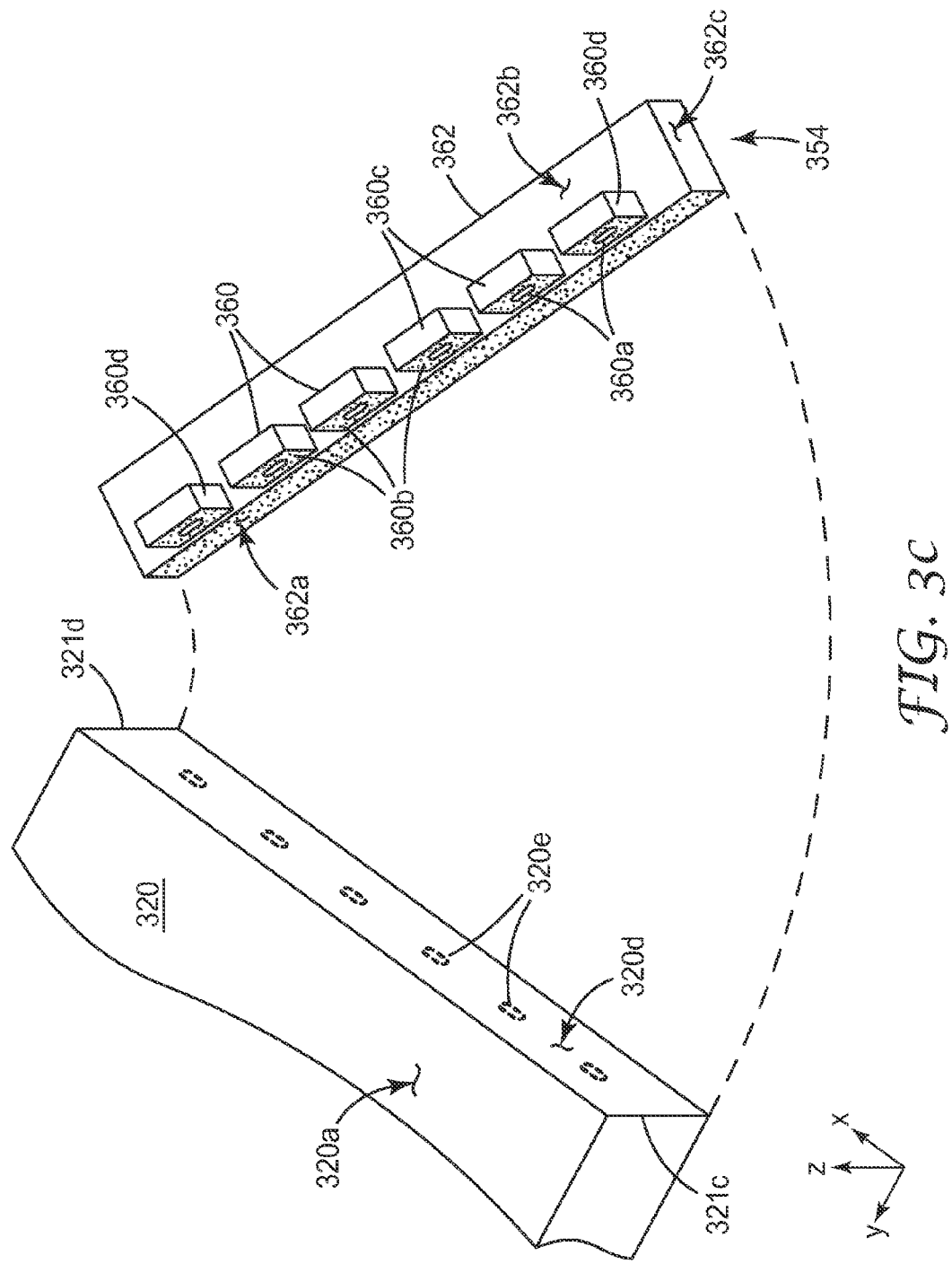
FIG. 3c is a perspective view similar to FIG. 3a, but where absorptive material has been applied to portions of the light source assembly.

Turning now to FIG. 3c, we see there an embodiment that reduces crosstalk while avoiding the drawbacks associated with FIGS. 3b and 4. The FIG. 3c embodiment is similar to that of FIG. 3b, except that the absorptive material has been applied to portions of the light source assembly rather than to the side surface of the light guide. The light guide 320 of FIG. 3c may be identical to the light guide 320 shown and described in connection with FIG. 3a, and thus the same reference numerals are used and no further description of it is necessary. The light source assembly 354 of FIG. 3c may also be substantially the same as light source assembly 324 of FIGS. 3a and 3b, except for the addition of a layer of absorptive material (shown in the figure by shading) which covers one or more non-emitting surfaces of the light source assembly but does not cover light-emitting surfaces 360a of the assembly 354. Except for the presence of the absorptive material, light source assembly 354 may correspond substantially to light source assembly 324, lamps 360 may correspond substantially to lamps 330, emitting surfaces 360a may correspond substantially to emitting surfaces 330a, surfaces 360b, 360c, 360d may correspond substantially to surfaces 330b, 330c, 330d, respectively, substrate 362 may correspond substantially to substrate 332, and surfaces 362a, 362b, 362c may correspond substantially to surfaces 332a, 332b, 332c, respectively. Just as with the embodiments of FIGS. 3a and 3b, When the assembly 354 is mounted in its intended position adjacent the light guide, the light emitting surfaces 360a line up with corresponding portions 320e of the side surface 320d. Preferably, an air gap is maintained between the side surface 320d and the assembly 354, even if the assembly 354 or portions thereof make physical contact with the side surface.

Light that originates from a light source assembly (not shown) mounted on an opposite side of the light guide 320, and that impinges upon side surface 320d from inside the light guide, is highly transmitted into the air adjacent surface 320d. Much of this light would typically be reflected directly or indirectly from a variety of objects in the vicinity of the side surface, and may re-enter the light guide 320 via the side surface 320d where it can contribute to crosstalk. To prevent this, one or more non-emitting surfaces of the light source assembly 354 are coated with, made from, or covered by a material that is highly absorptive of visible light, with little or no reflectivity of such light. In the figure, surfaces 360b and 362a, which are oriented parallel to and disposed immediately adjacent the side surface 320d when the assembly 354 is mounted in its intended position, are shown to be covered by or made from such an absorptive material. Other surfaces of the assembly may alternatively or additionally be coated with or made from the same absorptive material or a different but similarly effective absorptive material. For example, one, some, or all of the non-emitting surfaces of light source assembly 354 (whether visible from the perspective of FIG. 3c or hidden behind other surfaces), or of any of the other light source assemblies depicted or described herein, may be coated with or made from the absorptive material, including but not limited to non-emitting surfaces 360b, 360c, 360d, 362a, 362b, and 362c. Furthermore, the light source assembly 354, and other depicted or described light source assemblies, may be partially encapsulated or engulfed in a volume or mass of absorptive material, and/or one or more such volumes or masses of absorptive material may be deposited on or otherwise adhered to the light source assembly, e.g., between each pair of adjacent light sources in the assembly. In some cases, such volumes or masses of absorptive material are allowed to harden so that they do not flow or migrate to other portions of the backlight in the finished product.

A relatively simple way of providing the light source assembly with many highly absorptive surfaces is to construct the light source assembly with conventional components that may or may not be highly absorptive (or that may even be highly reflective), and then, prior to mounting the assembly at the end of the light guide, masking off the light-emitting surfaces of the assembly and applying black paint or a similar highly absorptive material to some or all surfaces of the assembly. Thereafter, the masking materials can be removed from the light-emitting surfaces, and the darkened assembly can be mounted in place at the side surface of the light guide, optionally in a highly absorptive potting medium and with a highly absorptive shield or cover. In an alternative embodiment, a black paint or similar material may be applied to some or all surfaces of the light source assembly including light-emitting surfaces, but portions of the paint on the light-emitting surfaces can later be selectively removed by etching or another suitable process. In a further alternative embodiment, the light source assembly, e.g. the LEDs, can be made of light absorbing material such that the normal amount of light is emitted from the light output face of the assembly but the other sides of the package are highly absorptive, e.g. black.

Exemplary absorptive materials useful in the disclosed embodiments include materials that reflect less than 10%, or less than 4%, of normally incident light when averaged over the visible wavelength spectrum, and absorb the remainder of the light. Such low reflectivity and high absorption is also preferably at least maintained for obliquely incident visible light.

Black or dark materials that can be used to make highly absorbing surfaces and volumes include surface treatments such as low reflectivity, e.g. flat, black paint which is spray-coated or painted on all non-emitting surfaces outside the light guide or a coated, polymeric material which can have a measureable thickness and is either inherently black or incorporates black particles. Such polymeric materials may be applied by immersing the light assembly into an appropriate coating. Light-emitting portions of the light sources can be protected from the coating, or the coating may preferentially not coat the light-emitting portions, or the coating may be applied only to non-emitting portions of the light sources.

Treatments that fill the volume in the vicinity of a light-injection surface of the light guide with black or highly absorptive materials may also be used. For example, one may choose to assemble the light source assembly, including light sources, and then mold a black or highly absorptive polymer material around the light-emitting surfaces and possibly one or more non-emitting surfaces of the light source assembly. In another example, one may choose to assemble the light guide and light source assemblies, including associated electrical and mechanical components, and then fill the cavities in which the light source assemblies are disposed with a curable black material, the black material functioning as a type of encapsulant. In some cases, such black material may extend to cover non-emitting regions of the end of the light guide surface and/or the non-emitting surfaces of the light sources, e.g., substrates, carriers, and/or other elements of an LED package.

Figure 5A:
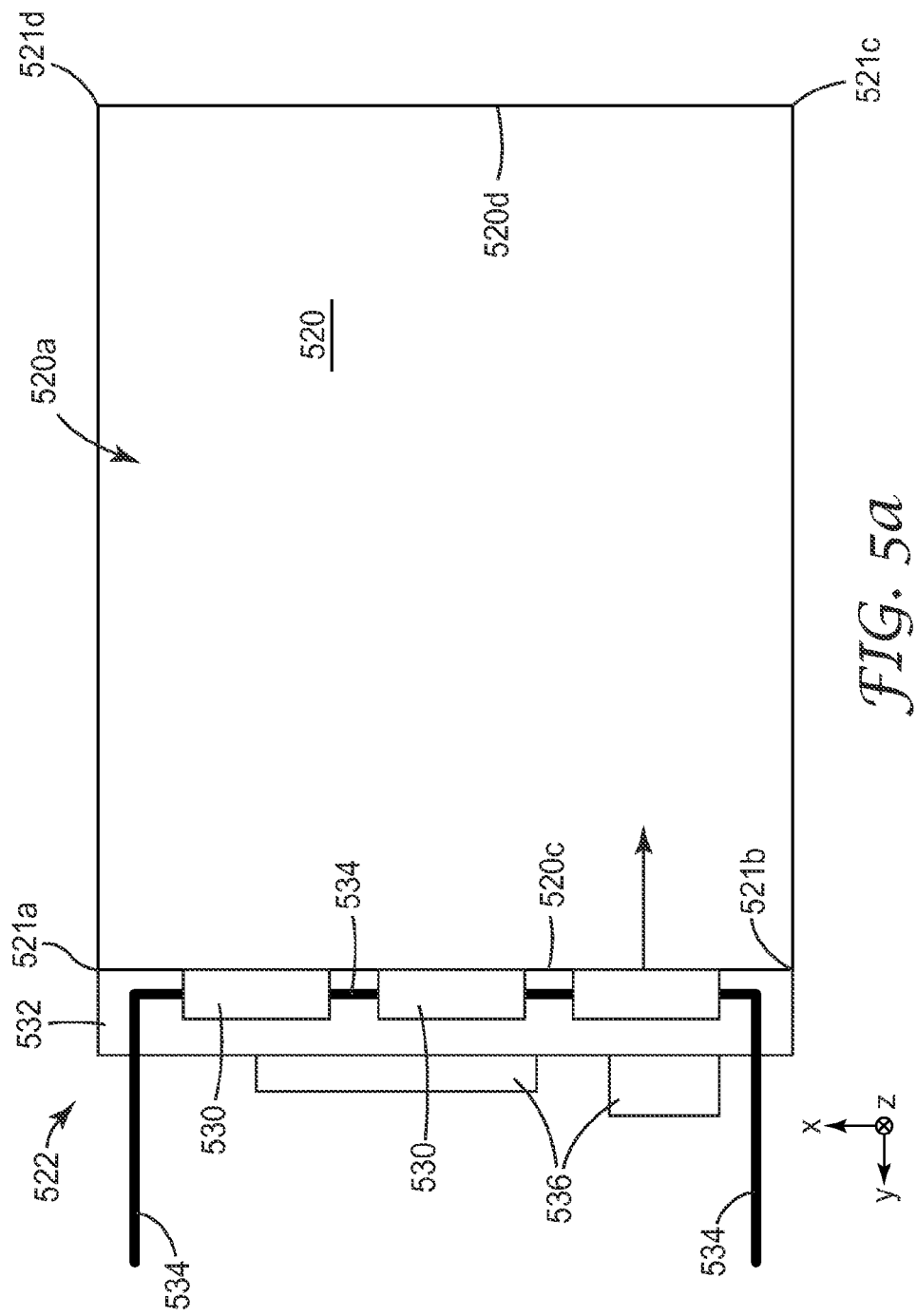
FIG. 5a is a schematic top view of a light guide and light source assembly for a backlight suitable for use in an autostereoscopic display device.
Figure 5B:
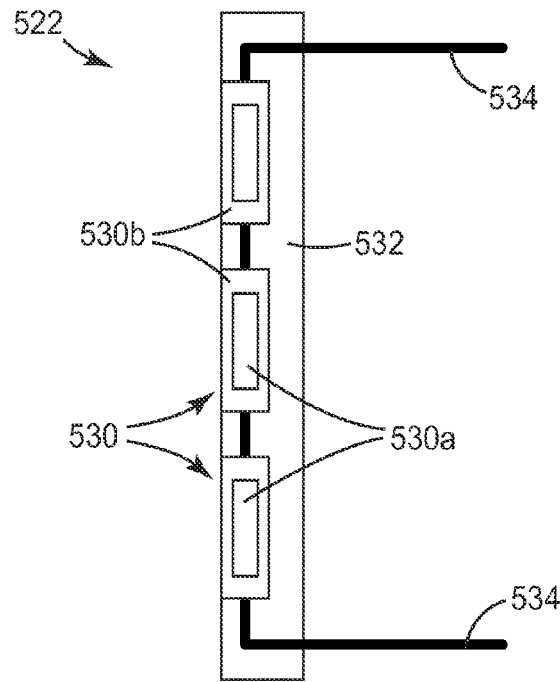

FIGS. 5a and 5b further exemplify another embodiment that reduces crosstalk by incorporating absorptive material in the light source assembly rather than on the side surface of the light guide. FIG. 5a is a schematic top view of a light guide 520 and light source assembly 522 for a backlight suitable for use in an autostereoscopic display device, and FIG. 5b is a schematic front view of the light source assembly 522.

Light guide 520, which may have the same or similar design as other light guides discussed herein, has a front or top major surface 520a from which light is extracted, a back or rear major surface (not shown), a side surface 520c extending from a corner 521a to a corner 521b, and a side surface 520d extending from a corner 521c to a corner 521d. Light source assembly 522 is disposed adjacent the side surface 520c to inject light therethrough into the light guide generally along the −y direction. The assembly 522 includes light sources or lamps 530, a circuit board 532 (comprising e.g. a sheet of Kapton material (E.I. du Pont de Nemours and Company) or similar polymer material, or other rigid or flexible electrical interconnect substrate), leads or wires 534, and other structural and/or cosmetic elements 536 that may be molded or otherwise fabricated. As seen in the front view of FIG. 5b, each light source includes at least one light-emitting surface 530a and at least one non-emitting surface 530b. Another light source assembly (not shown) of the same or similar design as assembly 522 is preferably provided adjacent the side surface 520d to inject light therethrough into the light guide generally along the +y direction.

Preferably, the side surfaces 520c, 520d of the light guide 520 are adapted to highly transmit light out of the light guide into air, and are substantially devoid of any absorptive material thereon. Instead, absorptive material is applied to, or otherwise incorporated into, one or more non-emitting surfaces of the light source assemblies so as to reduce reflections back into the light guide through the side surfaces, thus reducing undesirable crosstalk between the left- and right-channels of the backlight and display. For example, one or more surfaces of the elements 536, one or more surfaces of the circuit board 532, one or more surfaces of the wires 534, and/or one or more of the surfaces 530b (particularly if the sources 530 comprise LEDs with white ceramic packages), can be painted black with a black paint or similar absorptive material. Additionally or alternatively, the light sources 530 may be potted in a light absorbing material. Further, the light sources may also be fabricated of a light absorbing material except for the light emitting portions.

Figure 6:
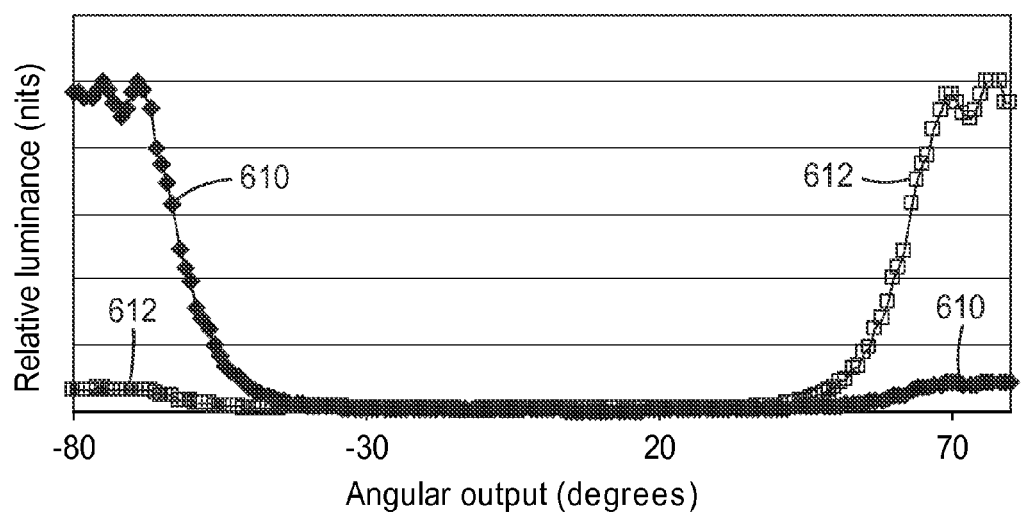
FIG. 6 is a graph of luminance versus angle for an exemplary backlight, the two curves showing the output when only a first light source assembly (e.g. a "left" assembly) is energized and when only a second light source assembly (e.g. a "right" assembly) is energized.

FIG. 6 is a graph of luminance versus angle for light emitted from the front major surface of an exemplary light guide similar to that of FIG. 2. Energizing the left-side light source assembly (see light sources 222, which in the embodiment were LEDs) produced a light distribution around the light ray 230. The measured luminance of this light distribution is shown by curve 612 in FIG. 6. For this curve, the high luminance at angles of about at +70 degrees represents useful light that is directed to the correct eye (e.g., LE) if a suitable redirecting film is used. On the other hand, any luminance for curve 612 in the range from about −70 to −80 degrees can be directed to the incorrect eye (e.g., RE) and thus represents crosstalk. Similarly, when the right-side light source assembly (see light sources 224, which in the embodiment were also LEDs) were energized, a light distribution around light ray 232 was produced. The measured luminance of this light distribution is shown by curve 610 in FIG. 6. For this curve, the high luminance at angles of about −80 degrees represents useful light that is directed to the correct eye (e.g. RE) if a suitable redirecting film is used. On the other hand, any luminance for curve 610 in the vicinity of about +70 degrees can be directed to the incorrect eye (e.g. LE) and thus represents crosstalk. The disclosed techniques help to reduce crosstalk by reducing the luminance of curve 610 in the vicinity of +70 degrees and reducing the luminance of curve 612 in the vicinity of −80 degrees. Note that in this embodiment, no steps were taken to utilize absorptive material either on the side surfaces of the light guide or on surfaces of the light source assemblies.

Figure 7:
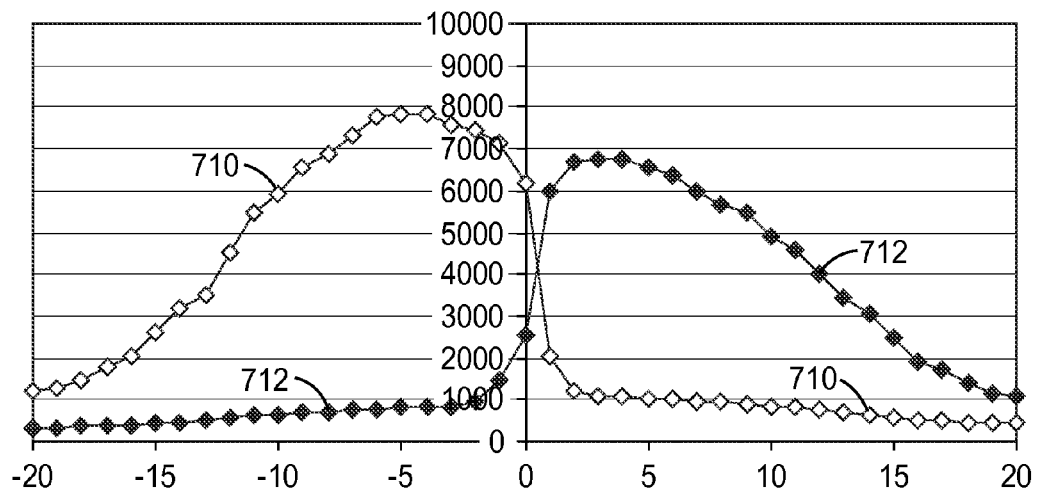
FIG. 7 is a graph of luminance versus angle for a backlight that includes a suitable redirecting film, the two curves again showing the output when only a first light source assembly is energized and when only a second light source assembly is energized.

FIG. 7 demonstrates the effect of adding an exemplary redirecting film, such as film 118 of FIGS. 1a and 1b, to the output of an exemplary light guide, such as that of FIG. 2. For such an embodiment, light from the right-side light source assembly (light sources 224) is extracted from the light guide in the general direction of light ray 232, and the redirecting film then redirects that light to produce a measured luminance as shown by curve 712 in FIG. 7. Similarly, light from the left-side light source assembly (light sources 222) is extracted from the light guide in the general direction of light ray 230, and the redirecting film redirects that light to produce a measured luminance as shown by curve 710 in FIG. 7. The luminance curves 710, 712 overlap with a very sharp separation between the two light distributions near 0 degrees, i.e., normal to the light guide.

Crosstalk is represented in FIG. 7 by non-zero luminance of the curve 710 in the vicinity of the peak of curve 712, e.g., at about +4 degrees, and by non-zero luminance of the curve 712 in the vicinity of the peak of curve 710, e.g., at about −4 degrees. By operation of the redirecting film, these angles roughly correspond to the highly oblique angles of 60 degrees and greater in the graph of FIG. 6. Note that a viewing distance of about 400 mm, with an average human eye separation of 65 mm, the right eye of an observer corresponds to a viewing angle (see FIG. 7) of about +4 degrees, and the left eye corresponds to a viewing angle of about −4 degrees.

Figure 8:
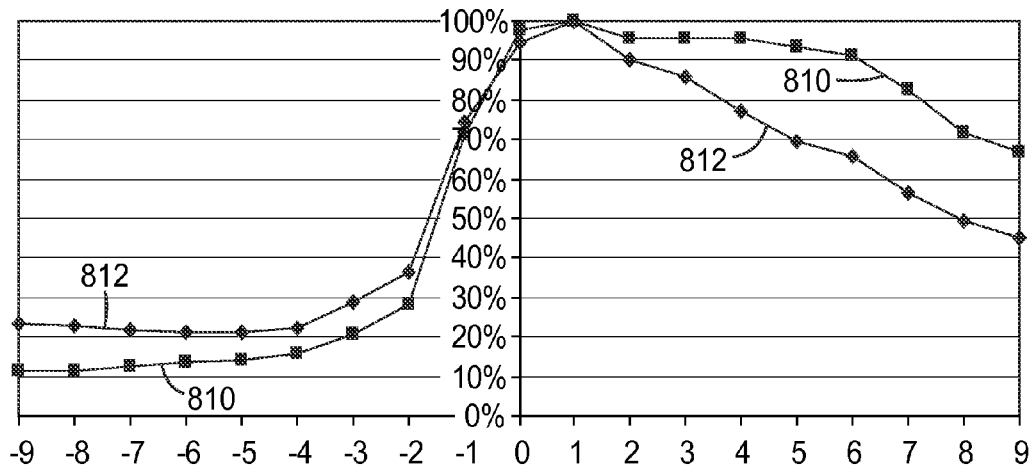
FIG. 8 is a graph of relative luminance versus angle for two similar backlights when one light source assembly is energized, the backlights differing only in that, for one backlight, absorptive material was applied to non-emitting surfaces of the light source assembly, and for the other backlight, no such absorptive material was applied.

FIG. 8 is a graph of relative luminance versus angle for two similar backlights when one light source assembly is energized, the backlights differing only in that, for one backlight, absorptive material was applied to non-emitting surfaces of the light source assembly, and for the other backlight, no such absorptive material was applied. The backlights included a redirecting film similar to that used in FIG. 7, and the curves 810, 812 in FIG. 8 thus correspond nominally to curve 712, i.e., the luminance of the backlight when only the right-side light source assembly is energized. Curve 810 corresponds to the embodiment in which absorptive material was used in the light source assembly, and curve 812 corresponds to the embodiment in which no such absorptive material was used. Note that the luminance values for curve 810 are lower in the vicinity of −4 degrees than the luminance values for curve 812. In particular, at −4 degrees, the relative luminance for curve 812 is 0.225 (22.5%), while the relative luminance for curve 810 is 0.160 (16%). The reduction from 0.225 to 0.160 represents a reduction in crosstalk of about 29%. Thus, a reduction in crosstalk of at least 10%, and at least 20%, and at least 25% was demonstrated using the disclosed technique.

For the embodiments of FIG. 8, each light source assembly utilized eight Nichia-brand LED light sources (part number NSSW206T) mounted on a metal stiffener for heat-spreading purposes. For the embodiment corresponding to curve 810, an acrylic black paint was applied, by hand painting, onto substantially all non-emitting surfaces of the light source assemblies, and was not applied to the light-emitting surfaces thereof, nor to any portion of the side surfaces of the light guide.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A backlight, comprising:
   a light guide having opposed first and second major surfaces, and opposed first and second side surfaces, the first side surface connecting the first major surface to the second major surface and extending between a first and second corner of the light guide, the second side surface also connecting the first major surface to the second major surface but extending between a third and fourth corner of the light guide different from the first and second corners;
   a first light source assembly disposed to inject visible light into the light guide through the first side surface, the first assembly comprising a first plurality of light-emitting surfaces and one or more first non-emitting surfaces; and
   a second light source assembly disposed to inject visible light into the light guide through the second side surface, the second assembly comprising a second plurality of light-emitting surfaces and one or more second non-emitting surfaces;
   wherein substantially all of the first side surface is adapted to highly transmit a second light portion out of the light guide into air, the second light portion originating from the second light source assembly, propagating through the light guide, and impinging on the first side surface;
   wherein substantially all of the second side surface is adapted to highly transmit a first light portion out of the light guide into air, the first light portion originating from the first light source assembly, propagating through the light guide, and impinging on the second side surface;
   wherein the one or more first non-emitting surfaces are disposed at least in part between two light-emitting surfaces of the first plurality of light-emitting surfaces, and are oriented at least in part to face the first side surface, the one or more first non-emitting surfaces being adapted to substantially absorb visible light,
   wherein air separates the first light source assembly from the first side surface, and air also separates the second light source assembly from the second side surface.

2. The backlight of claim 1, further wherein:
   the one or more second non-emitting surfaces are disposed at least in part between two light-emitting surfaces of the second plurality of light-emitting surfaces, and are oriented at least in part to face the second side surface, the one or more second non-emitting surfaces being adapted to substantially absorb visible light.

3. The backlight of claim 1, further wherein:
   at least a major portion of the first side surface is substantially flat; and
   at least a major portion of the second side surface is substantially flat.

4. The backlight of claim 3, further wherein:
   substantially all of the first side surface is substantially flat; and
   substantially all of the second side surface is substantially flat.

5. The backlight of claim 1, wherein the one or more first non-emitting surfaces have an average reflectivity of less than 10% for normally incident light in a range from 400-700 nm.

6. The backlight of claim 5, wherein the one or more first non-emitting surfaces have an average reflectivity of less than 4% for normally incident light in a range from 400-700 nm.

7. The backlight of claim 1, wherein the substantial absorption of visible light by the one or more first non-emitting surfaces reduces a crosstalk luminance associated with an "on" state of the second light source assembly by at least 10%.

8. The backlight of claim 7, wherein the substantial absorption of visible light by the one or more first non-emitting surfaces reduces the crosstalk luminance by at least 20%.

9. The backlight of claim 8, wherein the substantial absorption of visible light by the one or more first non-emitting surfaces reduces the crosstalk luminance by at least 25%.

10. The backlight of claim 1, wherein the first light source assembly comprises a plurality of individual light sources, with intermediate non-emitting portions disposed between the individual light sources, and wherein each intermediate non-emitting portion includes a non-emitting surface that substantially absorbs visible light.

11. The backlight of claim 1, wherein the first light source assembly comprises a plurality of individual light sources, and wherein first portions of the first side surface are disposed nearest the individual light sources and second portions of the first side surface are disposed between the first portions, and wherein both the first portions and the second portions are substantially light transmissive and non-absorptive of visible light.

12. The backlight of claim 1, wherein the first light source assembly comprises a plurality of light emitting diodes (LEDs), and the second light source assembly also comprises a plurality of LEDs.

13. The backlight of claim 1, wherein the first side surface includes an anti-reflective coating applied thereto.

14. The backlight of claim 1, wherein the light guide is composed of a light-transmissive material, and wherein the first side surface is an interface between the light-transmissive material and air.

15. The backlight of claim 1, wherein the light guide is adapted to direct light from the first light source assembly out the first major surface in a first distribution pattern, and to direct light from the second light source assembly out the first major surface in a second distribution pattern different from the first distribution pattern to allow autostereoscopic viewing.

16. An autostereoscopic display, comprising:
    a liquid crystal display panel; and
    the backlight of claim 1 disposed behind the liquid crystal display panel.

17. A method of making a backlight, comprising:
    providing a light guide having opposed first and second major surfaces, and opposed first and second side surfaces, the first side surface connecting the first major surface to the second major surface and extending between a first and second corner of the light guide, the second side surface also connecting the first major surface to the second major surface but extending between a third and fourth corner of the light guide different from the first and second corners;

providing a first light source assembly, the first assembly comprising a first plurality of light-emitting surfaces and one or more first non-emitting surfaces, the first light source assembly adapted to inject light from the first plurality of light-emitting surfaces into the first side surface of the light guide; and providing a second light source assembly, the second assembly comprising a second plurality of light-emitting surfaces and one or more second non-emitting surfaces, the second light source assembly adapted to inject light from the second plurality of light-emitting surfaces into the second side surface of the light guide;

selectively applying a first absorptive material to at least a portion of the one or more first non-emitting surfaces without applying any absorptive material to the first plurality of light-emitting surfaces and without applying any absorptive material to the first side surface of the light guide; and positioning the first light source assembly proximate the first side surface with an air gap therebetween such that the one or more first non-emitting surfaces are oriented at least in part to face the first side surface.

18. The method of claim 17, further comprising:
selectively applying a second absorptive material to at least a portion of the one or more second non-emitting surfaces without applying any absorptive material to the second plurality of light-emitting surfaces and without applying any absorptive material to the second side surface of the light guide; and
positioning the second light source assembly proximate the second side surface with an air gap therebetween such that the one or more second non-emitting surfaces are oriented at least in part to face the second side surface.

19. The method of claim 17, wherein the selectively applying is effective to reduce a crosstalk luminance of the display by at least 10%.

20. The method of claim 17, wherein the selectively applying is effective to reduce a crosstalk luminance of the display by at least 20%.

21. The method of claim 17, wherein the selectively applying is effective to reduce a crosstalk luminance of the display by at least 25%.

* * * * *